US008910131B2

(12) United States Patent
Moosmann et al.

(10) Patent No.: US 8,910,131 B2
(45) Date of Patent: Dec. 9, 2014

(54) METHOD AND APPARATUS FOR GENERATING AN APPLICATION PROGRAM FOR A SAFETY-RELATED CONTROL UNIT

(75) Inventors: Peter Moosmann, Ostfildern (DE); Matthias Reusch, Hohenstein (DE)

(73) Assignee: Pilz GmbH & Co. KG, Ostfildern (DE)

( * ) Notice: Subject to any disclaimer, the term of this patent is extended or adjusted under 35 U.S.C. 154(b) by 0 days.

(21) Appl. No.: 13/276,882

(22) Filed: Oct. 19, 2011

(65) Prior Publication Data

US 2012/0096428 A1 Apr. 19, 2012

Related U.S. Application Data

(63) Continuation of application No. PCT/EP2010/002435, filed on Apr. 20, 2010.

(30) Foreign Application Priority Data

Apr. 20, 2009 (DE) .......................... 10 2009 019 089

(51) Int. Cl.
| | | |
|---|---|---|
| *G05B 9/02* | (2006.01) | |
| *H02H 3/05* | (2006.01) | |
| *G06F 11/10* | (2006.01) | |
| *G05B 19/042* | (2006.01) | |

(52) U.S. Cl.
CPC .......... *G06F 11/1004* (2013.01); *G05B 19/042* (2013.01)
USPC ............... 717/140; 700/79; 714/52; 717/106; 717/126

(58) Field of Classification Search
USPC .......... 700/79, 9, 86; 714/38.1, 755; 717/100, 717/108, 140, 126
See application file for complete search history.

(56) References Cited

U.S. PATENT DOCUMENTS

| | | | |
|---|---|---|---|
| 4,939,732 A | 7/1990 | Okamoto et al. | |
| 5,598,530 A | 1/1997 | Nagae | |
| 6,201,996 B1 * | 3/2001 | Crater et al. ...................... 700/9 |

(Continued)

FOREIGN PATENT DOCUMENTS

| | | |
|---|---|---|
| CN | 1666178 A | 9/2005 |
| DE | 10 2004 035 456 A1 | 2/2006 |

(Continued)

OTHER PUBLICATIONS

EN 954-1, Safety-related parts of control systems Part 1: General principles for design, Mar. 1997, 34 pages.

(Continued)

*Primary Examiner* — Lewis A Bullock, Jr.
*Assistant Examiner* — Gilles Kepnang
(74) *Attorney, Agent, or Firm* — Harness, Dickey & Pierce, P.L.C.

(57) ABSTRACT

A safety controller designed to control an automated installation having a plurality of sensors and a plurality of actuators. A method for generating a user program for the safety controller comprises the step of generating a source code having a number of control instructions for controlling the actuators and having a number of diagnosis instructions for producing diagnosis reports. Safety-related program variables are processed in failsafe fashion during execution of the control instructions. A machine code is generated on the basis of the source code. At least one checksum is determined for at least some of the machine code. The diagnosis instructions are ignored for the determination of the checksum.

4 Claims, 2 Drawing Sheets

(56) References Cited

U.S. PATENT DOCUMENTS

| | | | |
|---|---|---|---|
| 6,647,301 B1* | 11/2003 | Sederlund et al. | 700/79 |
| 6,868,538 B1* | 3/2005 | Nixon et al. | 717/100 |
| 6,880,149 B2* | 4/2005 | Cronce | 717/126 |
| 7,451,351 B2* | 11/2008 | Gunnmarker et al. | 714/38.1 |
| 7,712,089 B2 | 5/2010 | Opem et al. | |
| 7,818,729 B1* | 10/2010 | Plum et al. | 717/140 |
| 2002/0120921 A1* | 8/2002 | Coburn et al. | 717/140 |
| 2004/0010326 A1* | 1/2004 | Schuster | 700/79 |
| 2004/0064205 A1* | 4/2004 | Kloper et al. | 700/86 |
| 2005/0071725 A1* | 3/2005 | Gibart | 714/755 |
| 2006/0101433 A1* | 5/2006 | Opem et al. | 717/140 |
| 2008/0028373 A1* | 1/2008 | Yang et al. | 717/140 |
| 2010/0211928 A1* | 8/2010 | Resnick et al. | 717/108 |

FOREIGN PATENT DOCUMENTS

| | | |
|---|---|---|
| DE | 10 2005 046 696 A1 | 4/2007 |
| WO | WO 88/09590 | 12/1988 |
| WO | WO 02/067065 A2 | 8/2002 |

OTHER PUBLICATIONS

EN ISO 13849-1, Safety of machinery—Safety-related parts of control systems—Part 1: General principles for design, Nov. 2006, 96 pages.

CEI IEC 61508-2; Functional safety of electrical/electronic/programmable electronic safety-related systems—Part 2: Requirements for electrical/electronic/programmable elecronic safety-related systems; May 2000; 150 pages.

* cited by examiner

METHOD AND APPARATUS FOR GENERATING AN APPLICATION PROGRAM FOR A SAFETY-RELATED CONTROL UNIT

CROSS REFERENCES TO RELATED APPLICATIONS

This application is a continuation of international patent application PCT/EP2010/002435 filed on Apr. 20, 2010 designating the U.S., which international patent application has been published in German language and claims priority from German patent application DE 10 2009 019 089.9 filed on Apr. 20, 2009. The entire contents of these priority applications are incorporated herein by reference.

BACKGROUND OF THE INVENTION

The present invention relates to a method and an apparatus for generating a user program for a safety controller which is designed to control an automated installation having a plurality of sensors and a plurality of actuators.

A safety controller in terms of the present invention is an apparatus or a device which picks up input signals delivered by sensors and produces output signals therefrom by virtue of logic combinations and possibly further signal or data processing steps. The output signals can then be supplied to actuators which take the input signals as a basis for effecting actions or reactions in a controlled installation.

A preferred field of application for such safety controllers is the monitoring of emergency-off pushbuttons, two-hand controllers, guard doors or light grids in the field of machine safety. Such sensors are used in order to safeguard a machine, for example, which represents a hazard to humans or material goods during operation. When the guard door is opened or when the emergency-off pushbutton is operated, a respective signal is produced and supplied to the safety controller as an input signal. In response thereto, the safety controller then uses an actuator, for example, to shut down the part of the machine which is presenting the hazard.

In contrast to a "normal" controller, a characteristic of a safety controller is that the safety controller always ensures a safe state for the installations or machines presenting the hazard, even if a malfunction occurs in said safety controller or in an appliance connected thereto. Extremely high demands are therefore put on safety controllers in terms of their own failsafety, which results in considerable complexity for development and manufacture.

Usually, safety controllers require particular approval from a competent supervisory authority, such as the professional associations or what is called TÜV in Germany, before they are used. In this case, the safety controller must observe prescribed safety standards as set down, by way of example, in European standard EN 954-1 or a comparable standard, such as standard IEC 61508 or standard EN ISO 13849-1. In the following, a safety controller is therefore understood to mean an apparatus or device which at least complies with safety category 3 of the aforementioned European standard EN 954-1 or Safety Integrity Level (SIL) 2 according to the aforementioned standard IEC 61508.

A programmable safety controller allows the user to individually define the logic combinations and possibly further signal or data processing steps according to his needs using a piece of software, what is known as the user program. This results in a great deal of flexibility in comparison with earlier solutions, in which the logic combinations were produced by defined hardwiring between different safety components. By way of example, a user program can be written using a commercially available personal computer (PC) and using appropriately set-up software programs.

As already mentioned, safety controllers require a particular approval from a competent supervisory authority before they are used. Such approval involves verification of the safety-related scope of the user program. The safety-related part of the user program is defined by the safety instructions required for the safety tasks which are to be accomplished by the safety controller. The handling of the safety instructions involves safety-related program variables being processed in failsafe fashion. When verification has been performed, a checksum is determined for the safety-related part of the user program, particularly for the safety-related part of the machine code, and this safety-related part is put under the seal of the checksum. Following acceptance, the supervisory authority can use the checksum to detect changes made to the safety-related part of the user program. It is thus possible to identify inadmissible manipulations concerning the safety-related part of a user program, for example.

If, following approval by the supervisory authority, changes to the safety-related scope of an existing user program are made, for example in order to optimize the application running on the controlled installation, it is necessary for the modified user program to be approved again by the supervisory authority. Since the safety-related scope of a user program also comprises diagnosis instructions, a new approval is also required when changes to such diagnosis instructions are merely made. Unfortunately, it is not unusual for changes to the diagnosis instructions to be made following approval. By way of example, knowledge requiring adaptation of the diagnosis instructions is obtained only on the basis of a test mode in the installation. Since diagnosis instructions, in contrast to safety control instructions, are not relevant to safety per se, it is disadvantageous if a new approval from a supervisory authority is required even though mere changes to the diagnosis instructions have been made after the approval has taken place. This results to an increased time effort and additional costs. Moreover, this restricts the flexibility in the development of an installation to be controlled and hence for the generating of a user program.

SUMMARY OF THE INVENTION

It is therefore an object of the present invention to provide a method and an apparatus of the type cited at the outset in order to further increase the flexibility for the generating of a user program and hence for the production of a safety controller, so as therefore to allow faster and less expensive programming of a safety controller.

According to an aspect of the invention, there is provided a method for generating a user program for a safety controller which is designed to control an automated installation having a plurality of sensors and a plurality of actuators, the method comprising the steps of generating a source code for a user program, said source code comprising a number of control instructions for controlling the actuators and a number of diagnosis instructions for producing diagnosis reports, wherein safety-related program variables are processed in failsafe fashion during execution of the control instructions; generating a machine code on the basis of the source code, and determining at least one checksum for at least some of the machine code; wherein the diagnosis instructions are ignored for the determination of the checksum.

According to another aspect, there is provided an apparatus for generating a user program for a safety controller designed to control an automated installation having a plurality of sensors and a plurality of actuators, the apparatus comprising a first unit for generating a source code for a user program, said source code comprising a number of control instructions for controlling the actuators and a number of diagnosis instructions for producing diagnosis reports, wherein safety-related program variables are processed in failsafe fashion during execution of the control instructions; a second unit for generating a machine code on the basis of the source code; a third unit for determining at least one checksum, wherein the checksum is determined for at least some of the machine code, and wherein the determination of the checksum ignores the diagnosis instructions.

The novel method and the novel apparatus are based on the idea that the determination of the checksum ignores the diagnosis instructions. The checksum is therefore determined for the safety control instructions only. Hence, the diagnosis instructions are ignored even for that checksum which is determined as part of the approval from a supervisory authority. It is therefore possible, when approval has taken place, to make changes to the diagnosis instructions without this having any influence on the checksum which is to be produced for the purpose of verification. It is therefore possible, following approval or acceptance, for additions to be made to diagnosis instructions which were already present before the approval. Alternatively, it is possible to add diagnosis instructions to the user program for the first time after approval has taken place. This increases the flexibility for generating user programs. Since changes to the diagnosis instructions do not require a renewed approval of the user program by one of the supervisory authorities, there is a reduction in the time involvement and consequently also in the costs for generating user programs and hence programming a safety controller.

In a refinement of the invention, the diagnosis instructions are marked.

Marked diagnosis instructions can be identified explicitly. This ensures that the diagnosis instructions are identified and therefore definitively ignored when the checksum is determined. The effect of this refinement is that the method according to the invention and the apparatus according to the invention work reliably.

Preferably, the diagnosis markings are automatically made during the generating of the source code by a computer program which is used for generating the user program. This means that the programmer of the user program does not have to do this himself. This refinement saves time and costs. Furthermore, it guarantees a high level of reliability for the method according to the invention and the apparatus according to the invention.

Preferably, the diagnosis instructions are marked by placing a respective diagnosis marking in front and behind. The diagnosis instructions are therefore embedded in or framed by two diagnosis markers. Alternatively, other measures for marking the diagnosis instructions are conceivable. Thus, every single diagnosis instruction can be marked by inserting special characters provided for this purpose, for example.

In a further refinement of the invention, the machine code comprises a first safety code and a second safety code, wherein a respective checksum is determined for each of the two safety codes.

This refinement allows a particularly high level of flexibility in respect of changes which are possibly made following approval from a supervisory authority. If, by way of example, changes are made which only affect one of the two channels in a safety controller, a renewed approval is required only for that part of the user program which is associated with this channel.

In a further refinement, the machine code comprises a first safety code and a second safety code, wherein the generation of the first safety code takes account of the diagnosis instructions and the generation of the second safety code ignores said diagnosis instructions.

This refinement has the advantage that one of the two channels in the safety controller is completely free of diagnosis instructions. Therefore, changes to the diagnosis instructions do not affect this channel in any way. It is therefore possible for further diagnosis instructions to be added to already existing diagnosis instructions or even for diagnosis instructions to be produced for the first time without this influencing this channel.

It goes without saying that the features cited above and those which are yet to be explained below can be used not only in the respectively indicated combination, but also in other combinations or on their own without departing from the scope of the present invention.

BRIEF DESCRIPTION OF THE DRAWINGS

Exemplary embodiments of the invention are illustrated in the drawing and are explained in more detail in the description which follows. In the drawing.

DESCRIPTION OF PREFERRED EMBODIMENTS

Figure 1:
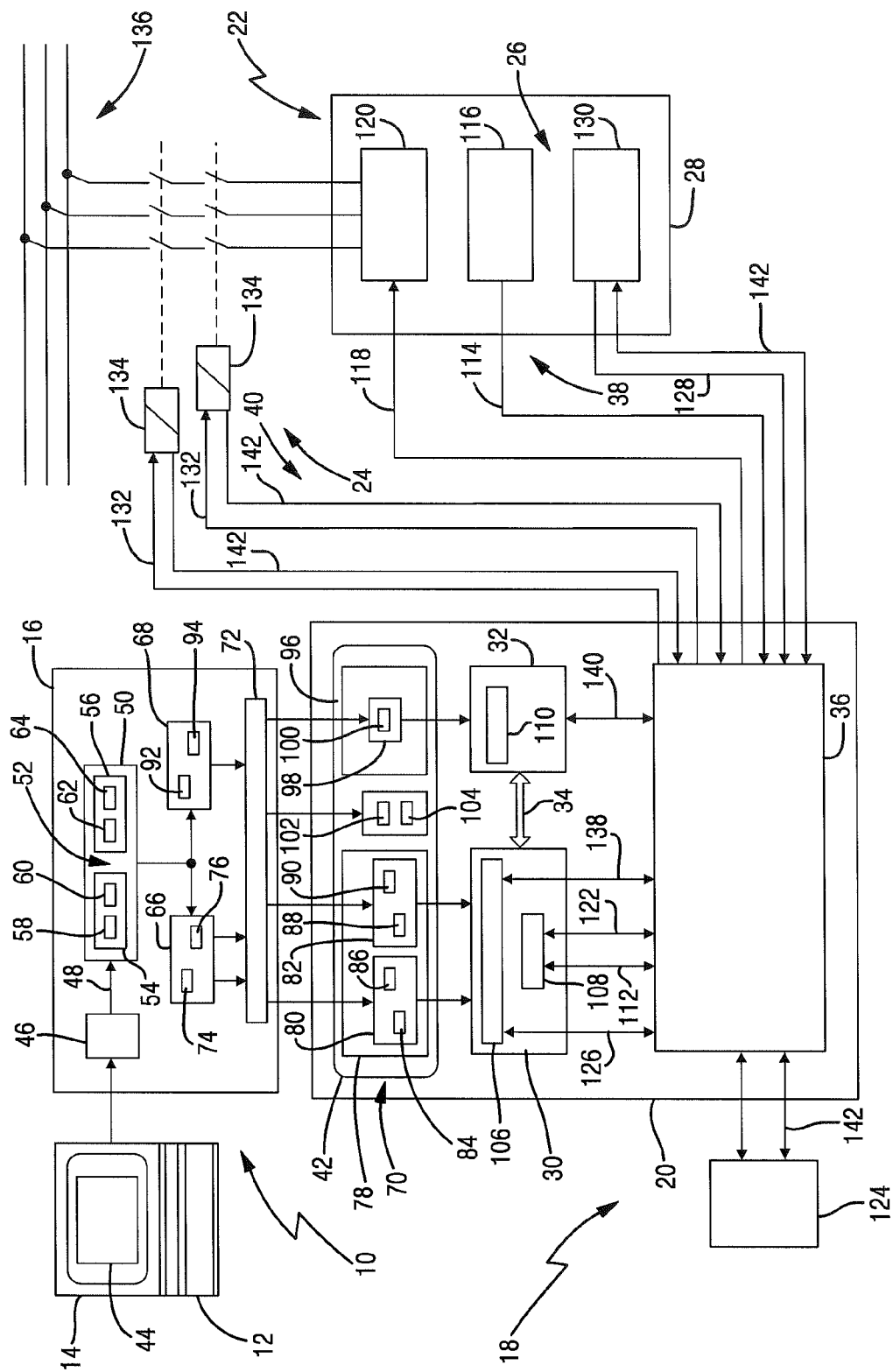
FIG. 1 shows a schematic illustration of an installation which is to be controlled.

In FIG. 1, an apparatus according to the invention is denoted as a whole by reference numeral 10.

The apparatus 10 comprises a conventional computer 12 having a display unit 14. The computer 12 executes a computer program 16. The computer program 16 allows a user program to be written for a safety controller. The computer program 16 is therefore often referred to as a programming tool in the terminology of the art. The computer 12 may be in the form of a PC and the display unit 14 may be in the form of a monitor.

FIG. 1 shows a safety circuit, denoted as a whole by reference numeral 18, which has a safety controller 20 designed to control an automated installation, denoted as a whole by reference numeral 22. The automated installation comprises a plurality of actuators 24 and a plurality of sensors 26. By way of example, a load 28 which the installation 22 contains is shown, which may be a robot, for example.

The safety controller 20 is of two-channel redundant design in order to facilitate the requisite failsafety for controlling safety-critical processes or applications. FIG. 1 shows two separate processors, namely a first processor 30 and a second processor 32, to represent the two-channel design. The two processors 30, 32 are in contact with one another via a bidirectional communication interface 34 in order to be able to monitor one another and interchange data. Preferably, the two channels of the safety controller 20 and the two processors 30, 32 are of diversitary design, i.e. different from one another, in order to largely preclude systematic errors.

Reference numeral 36 denotes an input/output unit which is in contact with each of the two processors 30, 32. The input/output unit 36 picks up a plurality of control input signals 38 from the plurality of sensors 26 and forwards them in an appropriate data format to each of the two processors 30, 32. In addition, the input/output unit 36 takes the processors 30, 32 as a basis for producing a plurality of control output signals 40 which are used to actuate the plurality of actuators 24.

Reference numeral 42 denotes a program memory which is used to store the user program in a form of machine code. The machine code is written using the apparatus 10. If the program memory 42 is in the form of a chip card, this allows simple interchange of the machine code and hence the user program even without direct connection to the computer 12. Alternatively, the program memory 42 may also be in the form of a memory which is permanently installed in the safety controller 20, for example an EEPROM.

The computer program 16 provides a user interface 44 on the display unit 14. The user interface 44 allows a programmer to write a user program. The programmer writes the user program by supplying inputs to the computer 12 using an input unit which is connected thereto. By way of example, the input unit may be a keyboard or a mouse. The input concepts differ depending on the programming language which is used for generating the user program. If the programming language used is Structured Text or Instruction List, for example, the user program is written by means of text inputs. If Function Block Diagram is used as the programming language, on the other hand, then the programmer writes the user program by selecting predefined program modules, which are represented on the user interface 44 by means of graphical symbols, for example, using a mouse.

The computer program 16 comprises a display module 46. The display module 46 is used to capture and evaluate the inputs made by the programmer using the input unit. Firstly, the display module 46 produces a source code part 48 which represents the respective input and which is stored in a source code memory 50. Secondly, the display module 46 prompts the display of graphical symbols on the user interface 44. These graphical symbols represent the inputs made by the programmer and hence the source code part 48 produced by the display module 46.

When the programmer has made all the inputs required for the user program, the source code memory 50 contains a source code 52. The source code 52 comprises a first source code component 54 and a second source code component 56. The first source code component 54 represents safety instructions which are required for the safety tasks to be accomplished by the safety controller 20. The safety instructions are first control instructions 58 for controlling actuators. The handling of the first control instructions 58 involves safety-related program variables being processed in failsafe fashion. First control instructions can also be called safety control instructions. In addition, the safety instructions comprise first diagnosis instructions 60 for producing diagnosis reports. The first diagnosis instructions can be called safety diagnosis instructions. The second source code component 56 represents standard instructions which are required for the standard tasks which are to be accomplished via the safety controller 20. The standard instructions are second control instructions 62 for controlling actuators. The handling of the second control instructions 62 involves non-safety-related program variables being processed, the non-safety related program variables not requiring failsafe processing. The second control instructions can also be called standard control instructions. In addition, the standard instructions comprise second diagnosis instructions 64 for producing diagnosis reports. The second diagnosis instructions can also be called standard diagnosis instructions.

A machine code 70 is produced from the source code 52 contained in the source code memory 50 using two compilers 66, 68. The machine code 70 is transmitted via a gateway 72 to the safety controller 20, wherein it is stored in the program memory 42. The machine code 70 is produced as follows:

The source code 52 is supplied to a first compiler 66. The first compiler 66 comprises a first machine code production unit 74 and a first checksum determination unit 76. The first machine code production unit 74 is used to produce a first machine code component 78. The first machine code component 78 comprises a first safety code 80 and a standard code 82. The first safety code 80 is produced on the basis of the first source code component 54. The first safety code 80 comprises third control instructions 84, namely safety control instructions, and third diagnosis instructions 86, namely safety diagnosis instructions. The production of the first safety code 80 therefore involves the first source code component 54 being converted completely into machine code, i.e. both the first control instructions 58 and the first diagnosis instructions 60 are converted into machine code. The following association holds: the first control instructions 58 available at the source code end correspond to the third control instructions 84 available at the machine code end. The first diagnosis instructions 60 available at the source code end correspond to the third diagnosis instructions 86 available at the machine code end.

The standard code 82 is produced on the basis of the second source code component 56. The standard code 82 comprises fourth control instructions 88, namely standard control instructions, and fourth diagnosis instructions 90, namely standard diagnosis instructions. The production of the standard code 82 therefore involves the second source code component 56 being converted completely into machine code, i.e. both the second control instructions 62 and the second diagnosis instructions 64 are converted into machine code. The following association holds: the second control instructions 62 available at the source code end correspond to the fourth control instructions 88 available at the machine code end. The second diagnosis instructions 64 available at the source code end correspond to the fourth diagnosis instructions 90 available at the machine code end.

In addition, the source code 52 is supplied to a second compiler 68. The second compiler 68 comprises a second machine code production unit 92 and a second checksum determination unit 94. The second machine code production unit 92 is used to produce a second machine code component 96. The second machine code component 96 comprises a second safety code 98. The second safety code 98 is produced on the basis of the first source code component 54. The second source code component 56 is ignored. The second safety code 98 comprises merely fifth control instructions 100, namely safety control instructions. The second safety code 98 comprises no diagnosis instructions. The production of the second safety code 98 therefore does not involve the complete first source code component 54 being converted into machine code. Only the first safety instructions 58 are converted into machine code. The first diagnosis instructions 60 are ignored.

The first checksum determination unit 76 is used to determine a first checksum 102 for the first safety code 80. However, the first checksum 102 is determined merely for the third control instructions 84 which the first safety code 80 contains. The third diagnosis instructions 86 which the first safety code 80 contains are ignored in this case. The first checksum 102 is likewise transmitted via the gateway 72 to the safety controller 20 and stored in the program memory 42. The second checksum determination unit 94 is used to determine a second checksum 104 for the second safety code 98. Since the second safety code 98 does not contain any diagnosis instructions, the determination of the second checksum 104 merely takes account of control instructions, specifically the fifth control instructions 100. The second checksum 104 is likewise transmitted via the gateway 72 to the safety controller 20 and stored in the program memory 42. Using the two checksums 102, 104 stored and therefore deposited in the safety controller 20, it is possible to check at any time whether the safety-related part of the user program executed by the safety controller 20 is identical to that safety-related part which was verified during the approval process by one of the supervisory authorities and placed under the seal of a checksum determined at that time. Preferably, the checksums determined during the approval are also stored in the safety controller 20.

Advantageously, the two machine code production units 74, 92 and the two checksum determination units 76, 94 are of diversitary design. Alternatively, it is conceivable for the two checksum determination units 76, 94 to be of identical design. In addition, it is conceivable for just a single checksum determination unit to be provided. This is then used to determine a respective checksum both for the first safety code 80 produced with the machine code production unit 74 and for the second safety code 98 produced with the machine code production unit 92.

Overall, the machine code 70 is made up from the first safety code 80, the standard code 82 and the second safety code 98, the first safety code 80 and the standard code 82 being associated with the first processor 30. The second safety code 98 is associated with the second processor 92. The user program written by the programmer is represented as a whole by the source code 52 and the machine code 70.

On the basis of the handling progress of the user program, the first processor 30 executes firstly a first current safety instruction 106 and secondly a current standard instruction 108. Essentially at the same time, the second processor 32 executes a second current safety instruction 110. The first current safety instruction 106 may be a safety control instruction which the third control instructions 84 contain or a safety diagnosis instruction which the third diagnosis instructions 86 contain. The current standard instruction 108 may be a standard control instruction which the fourth control instructions 88 contain or a standard diagnosis instruction which the fourth diagnosis instructions 90 contain. The second current safety instruction 110 is a safety control instruction which the fifth control instructions 100 contain. Safety control instructions are also called safety-related control instructions. Standard control instructions are also called non-safety-related control instructions.

If the current standard instruction 108 is a standard control instruction, first non-safety-related data 112 are interchanged between the first processor 30 and the input/output unit 36. In this case, the first processor 30 is supplied with data using program input variables, the instantaneous values of which represent values of non-safety-related control input signals 114 which are produced by non-safety-related sensors 116. The non-safety-related sensors 116 are such sensors as capture input variables which are required for closed-loop drive control, for example. These may be rotation speeds, angles or velocities, for example. The non-safety-related sensors 116 are of non-failsafe design. The input/output unit 36 is supplied with data using program output variables, the instantaneous values of which represent values of non-safety-related control output signals 118 which are supplied to non-safety-related actuators 120 for the purpose of actuating them. The non-safety-related actuators 120 may be motors or actuating cylinders, for example. The instantaneous values of the non-safety-related program output variables are determined on the basis of the non-safety-related program input variables in accordance with the standard control instructions.

If the current standard instruction 108 is a standard diagnosis instruction, second non-safety-related data 122 are interchanged between the first processor 30 and the input/output unit 36. By way of example, the first processor 30 is likewise supplied with the instantaneous values of the non-safety-related control input signals 114 and/or with the instantaneous values of the non-safety-related control output signals 118. On the basis of the supplied instantaneous values, it is then possible to establish which process state of the installation 22 to be controlled obtains. An appropriate diagnosis report is displayed by means of a diagnosis display unit 124.

If the first current safety instruction 106 is a safety control instruction, the first safety-related data 126 are interchanged between the first processor 30 and the input/output unit 36. In this case, the first processor 30 is supplied with data using safety-related program input variables, the instantaneous values of which represent values of safety-related control input signals 128 which are produced by safety-related sensors 130. By way of example, the safety-related sensors 130 are emergency-off pushbuttons, two-hand controllers, guard doors, speed monitoring appliances or other sensors for picking up safety-related parameters. The input/output unit 36 is supplied with data using safety-related program output variables, the instantaneous values of which represent values of safety-related control output signals 132 which are supplied to safety-related actuators 134 for the purpose of actuating them. The safety-related actuators 134 are what are known as contactors, for example, the operating contacts of which are arranged in the connection between a power supply 136 and the load 28. The safety-related actuators 134 can be used to shut down the power supply 136 for the load 28, as a result of which it is possible to transfer at least the load 28 to a safe state in the event of an appropriate malfunction occurring. The instantaneous values of the safety-related program output variables are determined on the basis of the safety-related program input variables in accordance with the safety control instructions.

If the first current safety instruction 106 is a safety diagnosis instruction, second safety-related data 138 are interchanged between the first processor 30 and the input/output unit 36. By way of example, the first processor 30 is likewise supplied with the instantaneous values of the safety-related control input signals 128 and/or with the instantaneous values of the safety-related control output signals 132. On the basis of the supplied instantaneous values, it is then possible to establish which process state of the installation 22 which is to be controlled obtains. An appropriate diagnosis report is displayed by means of a diagnosis display unit 134.

The second current safety instruction 110 is a safety control instruction for which the procedure corresponds to that for the first current safety instruction 106 executed in the first processor 30. For the second current safety instruction 110, third safety-related data 140, which correspond to the first safety-related data 136, are used.

The above explanations, according to which both the first processor 30 and the second processor 32 produce values for the safety-related control output signals 132, do not mean that the values produced by these two processors 30, 32 are output simultaneously as control output signals 132. The above explanations are merely intended to convey the redundant—in terms of the safety tasks which are to be accomplished—design of the safety controller 20. Both processors 30, 32 are designed to determine values for the control output signals 132. During correct operation of the safety controller 20, only the values determined by one processor, for example the first processor 30, are output as control output signals 132.

The input/output unit 36 is used to interchange test signals 142 between the safety controller 20 and the safety-related sensors 130, the safety-related actuators 134 and the diagnosis display unit 124. The test signals 142 can be used in the safety controller 20 to establish whether the components connected to it are operating correctly, which is necessary, since a safe state must be ensured for the installation 22 to be controlled as soon as a malfunction occurs on an appliance connected to the safety controller 20.

Figure 2:
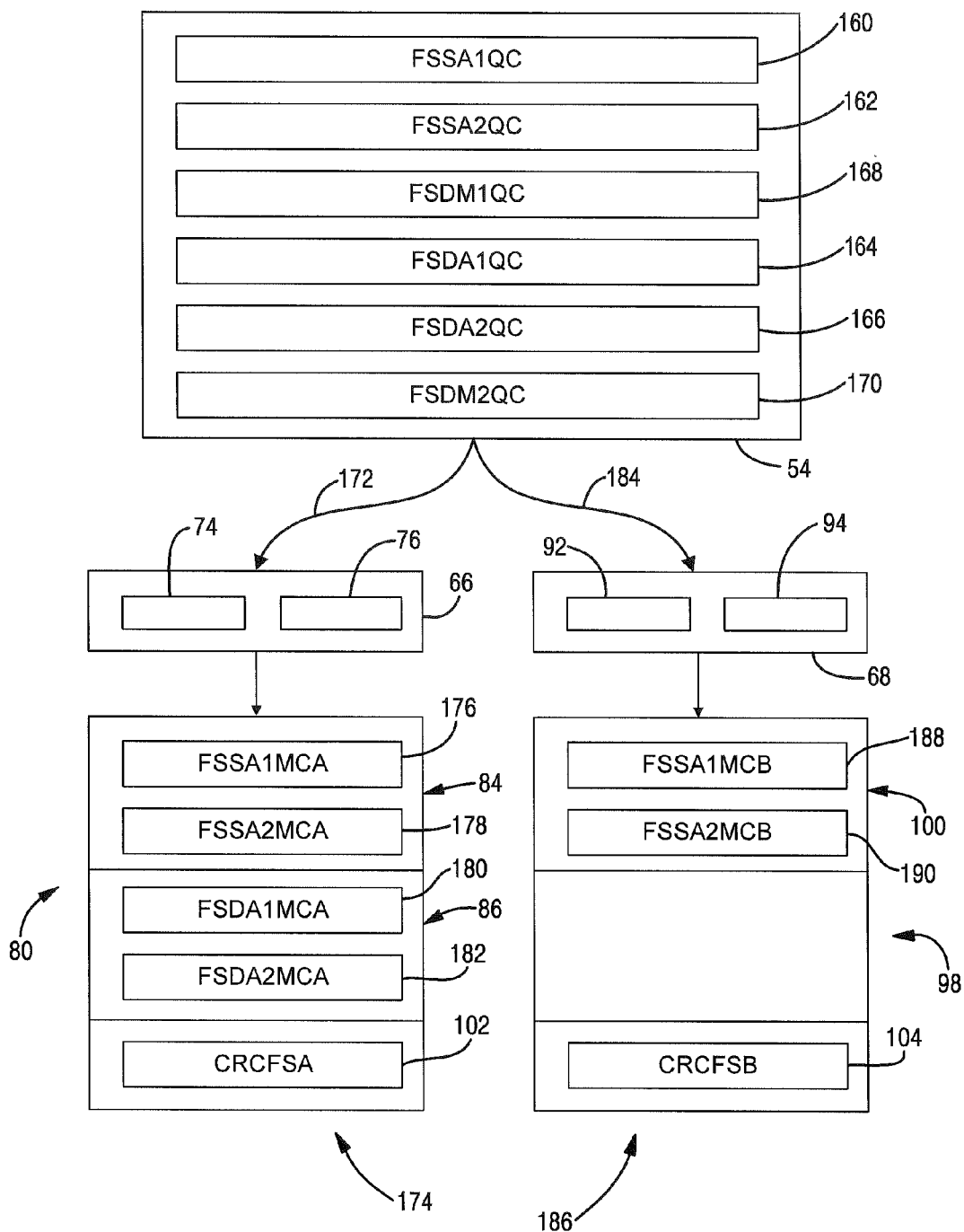
FIG. 2 shows a schematic illustration to explain the generation of machine code and the determination of checksums.

FIG. 2 shows the procedure for producing a machine code on the basis of the source code, with consideration being given only to the first source code component 54 and hence to the safety-related scope of the source code and hence of the user program.

The first source code component 54 comprises a first safety control instruction FSSA1QC, denoted by the reference numeral 160. The nomenclature used has the following meaning in this context: FS stands for "fail-safe" and therefore indicates that a safety-related control instruction is involved. SA stands generally for "control instruction". Suffixing the numeral 1 produces the identification for the safety control instruction, which can be used to identify said safety control instruction in a plurality of safety control instructions. QC indicates that a source-code-end safety control instruction is involved. This nomenclature is used as standard in FIG. 2.

The reference numeral 162 is used in a second safety control instruction FSSA2QC. The two safety control instructions FSSA1QC and FSSA2QC are contained in the first control instructions 58. The reference numbers 164, 166 are used to denote a first safety diagnosis instruction FSDA1QC and a second safety diagnosis instruction FSDA2QC. In this case, DA stands generally for "diagnosis instruction". Suffixing the numeral 1, for example, produces an identification which can be used to identify a safety diagnosis instruction in a plurality of safety diagnosis instructions.

The two safety diagnosis instructions FSDA1QC and FSDA2QC are encompassed or framed or enclosed by a first diagnosis marking FSDM1QC denoted by the reference numeral 168, and a second diagnosis marking FSDM2QC, denoted by the reference numeral 170. In this case, DM stands generally for "diagnosis marking". Suffixing the numeral 1, for example, produces an identification which can be used to identify a diagnosis marking. Using the two diagnosis markings FSDM1QC and FSDM2QC, it is possible to identify, during the process of compiling, safety diagnosis instructions which are contained in the first source code component 54. The two safety diagnosis instructions FSDA1QC and FSDA2QC and also the two diagnosis markings FSDM1QC and FSDM2QC are contained in the first diagnosis instructions 60.

The first source code component 54 is supplied to the first compiler 56, as indicated by an arrow 172. The first compiler 66 is used to produce first channel data 174. The first channel data 174 are associated with that channel which contains the first processor 30. The first machine code production unit 74 is used to produce a first safety code 80 which comprises third control instructions 84. The third control instructions 84 are a third safety control instruction FSSA1MCA, denoted by the reference numeral 176, and a fourth safety control instruction FSSA2MCA, denoted by the reference numeral 178. MC indicates that a machine-code-end safety control instruction is involved. The letter A indicates that these safety control instructions have been allocated to the first processor 30 and hence to the channel A. The following association holds between the source-code-end safety control instructions and the machine-code-end safety control instructions: the machine-code-end third safety control instruction FSSA1MCA is associated with the source-code-end first safety control instruction FSSA1QC. The machine-code-end fourth safety control instruction FSSA2MCA is associated with the source-code-end second safety control instruction FSSA2QC.

The first safety code 80 also comprises third diagnosis instructions 86. The third diagnosis instructions 86 are a third safety diagnosis instruction FSDA1MCA, denoted by the reference numeral 180, and a fourth safety diagnosis instructions FSDA2MCA, denoted by the reference numeral 182. The following association holds between the source-code-end safety diagnosis instructions and the machine-code-end safety diagnosis instructions: the machine-code-end third safety diagnosis instruction FSDA1MCA is associated with the source-code-end first safety diagnosis instruction FSDA1QC. The machine-code-end fourth safety diagnosis instruction FSDA2MCA is associated with the source-code-end second safety diagnosis instruction FSDA2QC.

The first checksum determination unit 76 is used to determine a first checksum CRCFSA, denoted by the reference numeral 102, for the first safety code 80. The letters CRC (cyclic redundancy check) indicate that said checksum determination is performed on the basis of a CRC method. The production of the first checksum CRCFSA merely takes account of the safety control instructions which the first safety code 80 contains, namely the two safety control instructions FSSA1MCA and FSSA2MCA. The safety diagnosis instructions which the first safety code 80 contains, namely the two safety diagnosis instructions FSDA1MCA and FSDA2MCA, are ignored.

The first checksum determination unit 76 is thus designed such that the safety diagnosis instructions which the first source code component 54 contains are ignored when the first checksum CRCFSA is determined. For this purpose, the first checksum determination unit 76 identifies the diagnosis markings which the first source code component 54 contains. The two diagnosis markings FSDM1QC and FSDM2QC stipulate for the first checksum determination unit 76 that the safety instructions arranged between these two diagnosis markings can be ignored when producing the first checksum CRCFSA.

The first source code component 54 is also supplied to the second compiler 68, as indicated by an arrow 184. The second compiler 68 is used to produce second channel data 186. The second channel data 186 are intended for that channel which contains the second processor 32. The second machine code production unit 92 is used to produce a second safety code 98. The second safety code 98 comprises fifth control instructions 100. The fifth control instructions 100 are a fifth safety control instruction FSSA1MCB, denoted by the reference numeral 188, and a sixth safety control instruction FSSA2MCB, denoted by the reference numeral 190. The letter B indicates that these safety control instructions have been allocated to the second processor 32 and hence the channel B. In this case, the following association holds between the source-code-end safety control instructions and the machine-code-end safety control instructions: the machine-code-end fifth safety control instruction FSSA1MCB is associated with the source-code-end first safety control instruction FSSA1QC. The machine-code-end sixth safety control instruction FSSA2MCB is associated with the source-code-end second safety control instruction FSSA2QC.

In this case, the second machine code production unit 92 is designed such that the safety diagnosis instructions which the first source code component 54 contains, namely the two safety diagnosis instructions FSDA1QC and FSDA2QC, are ignored. For this purpose, the second machine code production unit 92 identifies the diagnosis markings, which the first source code component contains, namely the two diagnosis markings FSDM1QC and FSDM2GC. The two diagnosis markings FSDM1QC and FSDM2GC stipulate for the second machine code production unit 92 that the safety instructions arranged between these two diagnosis markings can be ignored when generating the first safety code 98. The two diagnosis markings are identified as safety instructions arranged between them as safety diagnosis instructions.

The second checksum determination unit 94 is used to determine a second checksum CRCFSB, denoted by the reference numeral 104, for the second safety code 98. Since the second safety code 98 contains only safety control instructions, the determination of the second checksum CRCFSB takes account of no safety diagnosis instructions.

Since the two machine-code-end safety diagnosis instructions FSDA1MCA and FSDA2MCA are ignored when the first checksum CRCFSA is determined, the two source-code-end safety diagnosis instructions FSDA1QC and FSDA2QC are therefore also ignored for this.

What is claimed is:

1. A method for generating a user program for a safety controller which is designed to control an automated installation having a plurality of sensors and a plurality of actuators, the method comprising the steps of:
    generating a source code for a user program, said source code comprising a number of control instructions for controlling the actuators and a number of diagnosis instructions for producing diagnosis reports, the control instructions comprising safety control instructions processing safety-related program variables in failsafe fashion during execution of the user program on the safety controller, the control instructions further comprising standard control instructions processing non-safety-related program variables during execution of the user program on the safety controller, and the diagnosis instructions comprising safety diagnosis instructions for producing safety-related diagnosis reports and standard diagnosis instructions for producing non-safety-related diagnosis reports during execution of the user program on the safety controller,
    generating a machine code on the basis of the source code for the control instructions and the diagnosis instructions,
    producing a checksum associated with the machine code for the safety control instructions only,
    wherein the standard control instructions, the standard diagnosis instructions and the safety diagnosis instructions are ignored for the production of the checksum; and
    allowing modification to the safety diagnosis instructions without producing a new checksum.

2. The method of claim 1, wherein further comprises:
    sending the source code to a first compiler for compilation into the machine code and sending the source code to a second compiler for compilation to a second safety machine code, wherein the second safety machine code only contains machine code associated with the safety control instructions; and
    producing a second checksum associated with the second safety machine code that ignores said standard control instructions, the standard diagnosis instructions and the safety diagnosis instructions in the source code.

3. An apparatus for generating a user program for a safety controller designed to control an automated installation having a plurality of sensors and a plurality of actuators, the apparatus comprising:
    a first unit for generating a source code for a user program, said source code comprising a number of control instructions for controlling the actuators and a number of diagnosis instructions for producing diagnosis reports, the control instructions comprising safety control instructions processing safety-related program variables in failsafe fashion during execution of the user program on the safety controllers, the control instructions further comprising standard control instructions processing non-safety-related program variables during execution of the user program on the safety controller, and the diagnosis instructions comprising safety diagnosis instructions for producing safety-related diagnosis reports and standard diagnosis instructions for producing non-safety-related diagnosis reports during execution of the user program on the safety controller,
    a second unit for generating a machine code on the basis of the source code for the control instructions and the diagnosis instructions,
    a third unit for producing a checksum associated with the machine code for the safety control instructions only, wherein the third unit ignores the standard control instructions, the standard diagnosis instructions and the safety diagnosis instructions for the production of the checksum, and wherein the first unit allows modification to the safety diagnosis instructions without the third unit producing a new checksum.

4. The apparatus of claim 3, wherein the first unit sends the source code to a first compiler for compilation into the machine code and further sends the source code to a second compiler for compilation to a second safety machine code, the second safety machine code only containing machine code associated with the safety control instructions; and
    wherein the third unit produces a second checksum associated with the second safety machine code that ignores said standard control instructions, the standard diagnosis instructions and the safety diagnosis instructions in the source code.

* * * * *